(12) United States Patent
Ogawa (10) Patent No.: US 9,578,230 B2
(45) Date of Patent: Feb. 21, 2017

(54) IMAGE CAPTURING APPARATUS THAT PERFORMS SHADING CORRECTION AND CONTROL METHOD THEREFOR

(71) Applicant: CANON KABUSHIKI KAISHA, Tokyo (JP)

(72) Inventor: Takeshi Ogawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 195 days.

(21) Appl. No.: 14/292,101

(22) Filed: May 30, 2014

(65) Prior Publication Data

US 2014/0354875 A1 Dec. 4, 2014

(30) Foreign Application Priority Data

May 31, 2013 (JP) .................................. 2013-116245

(51) Int. Cl.
| | |
|---|---|
| H04N 5/232 | (2006.01) |
| G02B 7/34 | (2006.01) |
| H04N 5/369 | (2011.01) |
| H04N 5/357 | (2011.01) |

(52) U.S. Cl.
CPC ............ *H04N 5/23212* (2013.01); *G02B 7/34* (2013.01); *H04N 5/3572* (2013.01); *H04N 5/3696* (2013.01)

(58) Field of Classification Search
CPC  H04N 5/23212; H04N 5/3572; H04N 5/3696; G02B 7/34
USPC ........................................................ 348/349
See application file for complete search history.

(56) References Cited

U.S. PATENT DOCUMENTS 9,030,596 B2 * 5/2015 Shoda ................ H04N 5/23212
348/222.1
2012/0300104 A1 * 11/2012 Onuki ................ H04N 5/23212
348/302

FOREIGN PATENT DOCUMENTS

| JP | 07318793 | * | 12/1995 | ............... G02B 7/34 |
| JP | 2715958 B | | 2/1998 | |
| JP | 4265029 B | | 5/2009 | |
| JP | 2012134783 | * | 12/2010 | ............. H04N 5/367 |

* cited by examiner

*Primary Examiner* — Nhan T Tran
*Assistant Examiner* — Chan Nguyen
(74) *Attorney, Agent, or Firm* — Cowan, Liebowitz & Latman, P.C.

(57) ABSTRACT

An image capturing apparatus comprises an image sensor including a photoelectric conversion portion configured to receive light beams having passed through a portion of a pupil area of an imaging lens and output an image signal, a control unit configured to output, from the photoelectric conversion portion, a plurality of image signals captured by shifting a focus position of the imaging lens, an acquisition unit configured to acquire an image shift amount on an image sensing plane of the image sensor, which corresponds to a shift amount when shifting the focus position of the imaging lens; and a calculation unit configured to calculate a correction coefficient for shading on the image sensing plane based on the image shift amount by comparing signals corresponding to the same object among the plurality of image signals.

14 Claims, 10 Drawing Sheets

IMAGE CAPTURING APPARATUS THAT PERFORMS SHADING CORRECTION AND CONTROL METHOD THEREFOR

BACKGROUND OF THE INVENTION

Field of the Invention

The present invention relates to an image capturing apparatus which uses an image sensor having a pupil-dividing function and, more particularly, to a technique of satisfactorily correcting shading.

Description of the Related Art

There are conventionally proposed an image capturing apparatus for pupil-dividing one imaging optical system using a relay lens, and performing exposure using two image sensors, and a method of obtaining pupil-divided images by dividing a photoelectric conversion portion below a microlens into a plurality of portions. These apparatus and method can be used to, for example, obtain a stereo image using the parallaxes of a plurality of obtained images, perform automatic focus detection using a phase difference detection method, and create a distance image.

To obtain a distance image or perform focus detection, it is necessary to know how much two images shift in a pupil-divided direction, and thus a correlation operation such as SAD or SSD is performed. In a correlation operation, since the shift amount between images having a high degree of matching is searched for, if the degree of matching of the images with a correct shift amount is low, it is difficult to detect a correct shift amount. A factor which decreases the degree of matching of the images can be a difference in shading. It is, therefore, desired to satisfactorily correct shading.

For example, Japanese Patent No. 2715958 discloses a technique of estimating a shading level by detecting a level difference between an A image and a B image based on an image shift amount obtained by a correlation operation, and calculating a shading correction coefficient, thereby performing shading correction. Japanese Patent No. 4265029 discloses a technique of obtaining exit pupil information from an interchangeable lens, and calculating a shading correction coefficient.

In the above-described technique disclosed in Japanese Patent No. 2715958, however, since a correlation operation is performed in advance, if a wrong image shift amount is detected by the first correlation operation, a shading correction amount is largely wrong. Even though the correlation operation is wrong, its reliability improves.

Furthermore, in the above-described technique disclosed in Japanese Patent No. 4265029, since it is necessary to perform geometric calculation, the calculation amount is large, and it takes too long to perform calculation.

SUMMARY OF THE INVENTION

The present invention has been made in consideration of the above-described problems, and provides an image capturing apparatus which can calculate a shading correction coefficient with a small calculation amount without performing a correlation operation in advance.

According to the first aspect of the present invention, there is provided an image capturing apparatus comprising: an image sensor including a photoelectric conversion portion configured to receive light beams having passed through a portion of a pupil area of an imaging lens and output an image signal; a control unit configured to output, from the photoelectric conversion portion, a plurality of image signals captured by shifting a focus position of the imaging lens; an acquisition unit configured to acquire an image shift amount on an image sensing plane of the image sensor, which corresponds to a shift amount when shifting the focus position of the imaging lens; and a calculation unit configured to calculate a correction coefficient for shading on the image sensing plane based on the image shift amount by comparing signals corresponding to the same object among the plurality of image signals.

Furthermore, according to the second aspect of the present invention, there is provided a control method for an image capturing apparatus which includes an image sensor having a photoelectric conversion portion configured to receive light beams having passed through a portion of a pupil area of an imaging lens and output an image signal, the method comprising the steps of: causing a control unit to output, from the photoelectric conversion portion, a plurality of image signals captured by shifting a focus position of the imaging lens; causing an acquisition unit to acquire an image shift amount on an image sensing plane of the image sensor, which corresponds to a shift amount when shifting the focus position of the imaging lens; and causing a calculation unit to calculate a correction coefficient for shading on the image sensing plane based on the image shift amount by comparing signals corresponding to the same object among the plurality of image signals.

Further features of the present invention will become apparent from the following description of exemplary embodiments with reference to the attached drawings.

DESCRIPTION OF THE EMBODIMENTS

Embodiments of the present invention will be described in detail below with reference to the accompanying drawings.

(First Embodiment)

Figure 1:
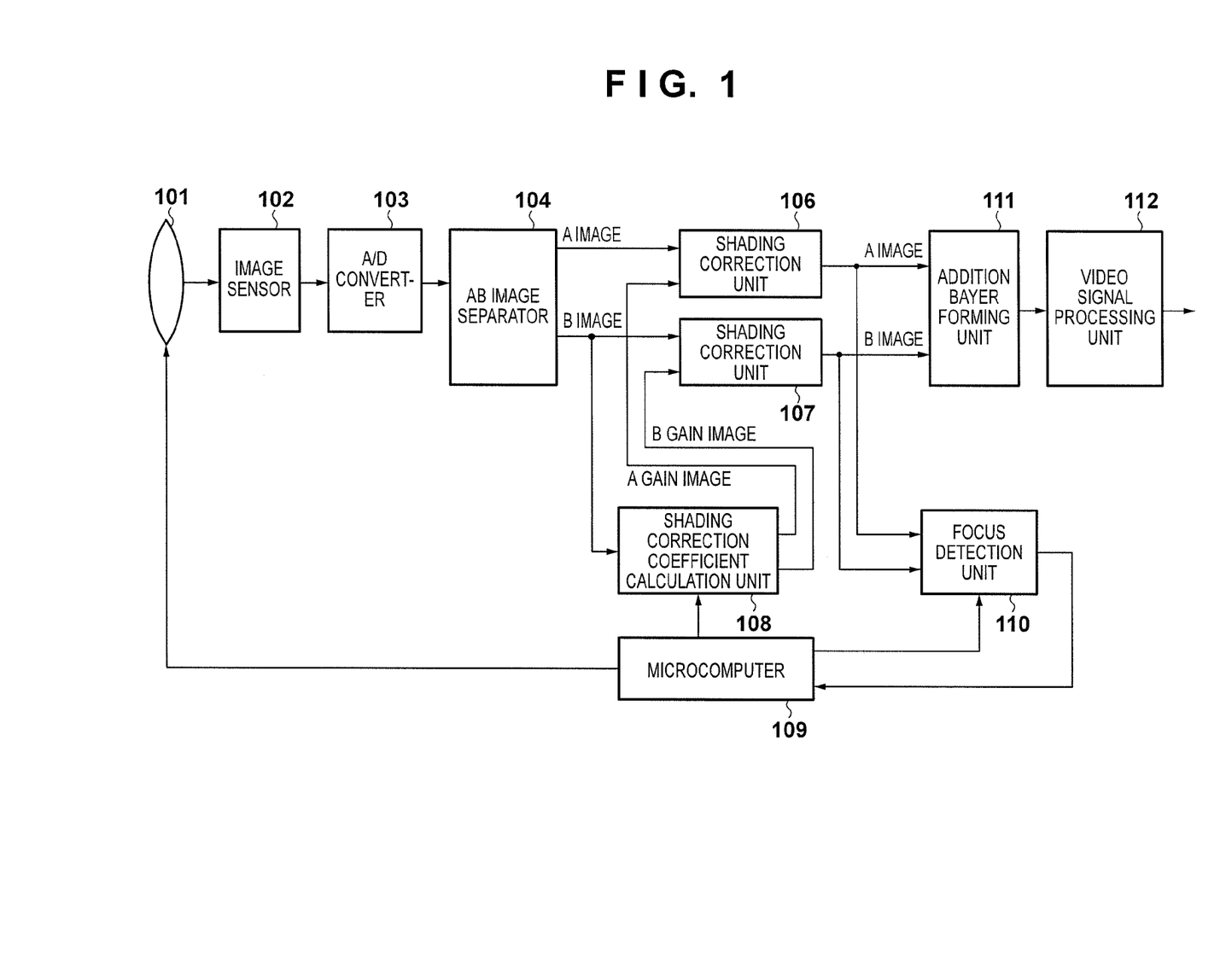
FIG. 1 is a block diagram showing the arrangement of an image capturing apparatus according to the first embodiment of the present invention.
Figure 2A:
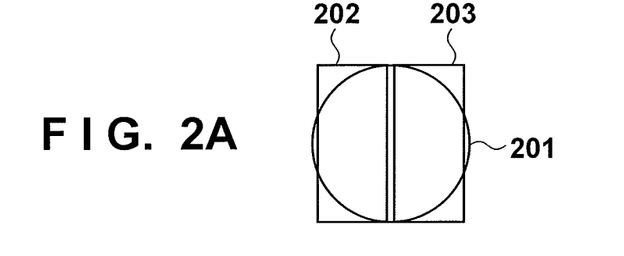
FIGS. 2A and 2B are views showing the pixel structure of an image sensor.
Figure 2B:
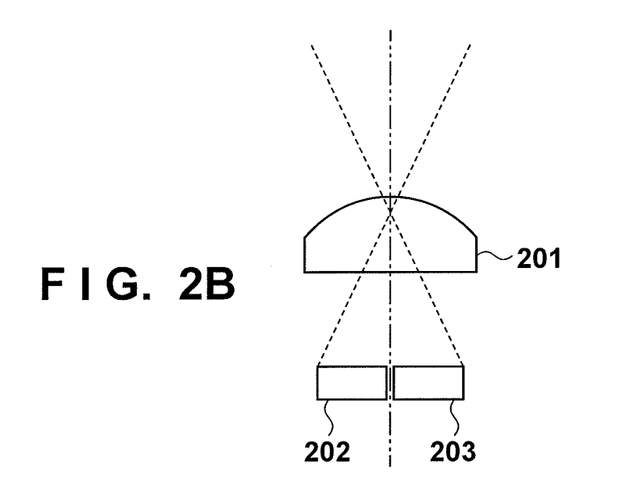

FIG. 1 is a block diagram showing the arrangement of an image capturing apparatus according to the first embodiment of the present invention. FIGS. 2A and 2B are views showing the pixel structure of an image sensor 102 shown in FIG. 1. FIG. 2A is a view showing the pixel when viewed from above. FIG. 2B is a sectional view showing the pixel. Referring to FIGS. 2A and 2B, reference numeral 201 denotes a microlens; and 202 and 203, photoelectric conversion portions. In a general image sensor, one photoelectric conversion portion is arranged for one microlens. However, in the image sensor of the first embodiment, a photoelectric conversion portion is divided into two portions each of which can read out different signals. With the structure shown in FIGS. 2A and 2B, it is possible to obtain pupil-divided images.

Figure 3:
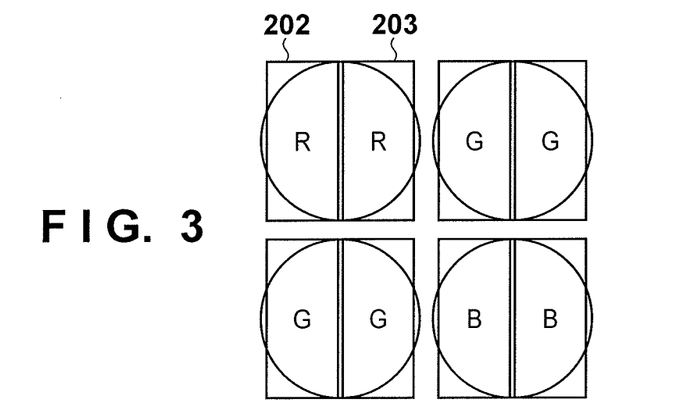
FIG. 3 is a view showing the pixel array of the image sensor.

FIG. 3 is a view showing the array of color filters. This array is called a Bayer array in which R (red), G (green), and B (blue) filters are two-dimensionally arranged at a given repetition period. The array shown in FIG. 3 makes it possible to create a color video signal from a signal obtained by adding the pixel values of the photoelectric conversion portions 202 and 203. In this embodiment, a color video signal is created by adding the signals of the photoelectric conversion portions 202 and 203.

The overall arrangement of the image capturing apparatus according to the first embodiment will be described with reference to FIG. 1. Referring to FIG. 1, reference numeral 101 denotes an imaging lens; 102, the image sensor; 103, an A/D converter; and 104, an AB image separator. The image sensor alternately outputs the signal of the first photoelectric conversion portion 202 for receiving light having passed through a first pupil area of the imaging lens 101 and that of the second photoelectric conversion portion 203 for receiving light having passed through a second pupil area of the imaging lens 101. The function of the AB image separator 104 separates two signals, which have been pupil-divided by the photoelectric conversion portions 202 and 203, into A and B image signals for the respective pupil areas. The A and B image signals output from the AB image separator 104 are input to shading correction units 106 and 107, and corrected by them, respectively. Note that the B image signal is also transferred to a shading correction coefficient calculation unit 108. The shading correction coefficient calculation unit 108 outputs A and B gain images, which are input to the shading correction units 106 and 107, respectively.

The A and B image signals which have been corrected by the shading correction units 106 and 107 are input to a focus detection unit 110 and an addition Bayer forming unit 111. The addition Bayer forming unit 111 adds the A and B images, and a video signal processing unit 112 converts the resultant image into a video signal. The output of the video signal processing unit 112 is used for display and recording. Display and recording are irrelevant to the present invention and a detailed description thereof will be omitted. A microcomputer 109 is a portion for controlling the overall image capturing apparatus.

Figure 4:
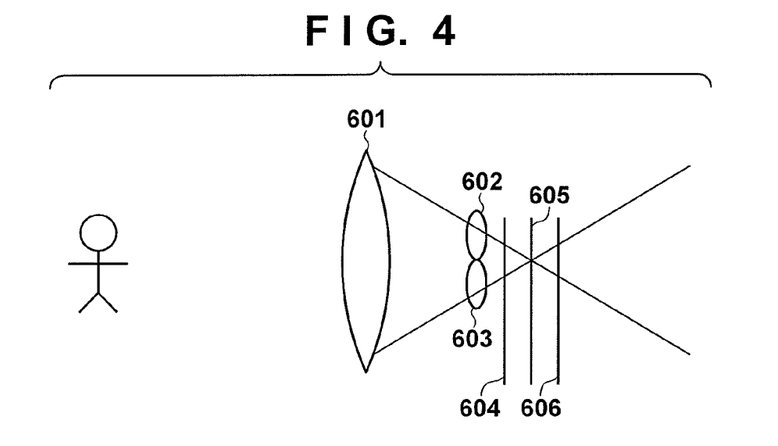
FIG. 4 is a view showing the relationship between pupil division and a focus position.

The characteristics of the pupil-divided images will be described with reference to FIG. 4. Reference numeral 601 denotes a lens. Exposure signals divided and input to photoelectric conversion portions 202 and 203 have characteristics equal to those of signals having passed through exit pupils 602 and 603. With respect to light beams passing through the exit pupils 602 and 603, light beams emitted from one point of an object converge on one point again on a focus plane 605 as a plane which is in focus. The light beams emitted from one point of the object are projected at different positions on a front plane 604 or rear plane 606 with reference to the focus plane 605. If the light beams exiting from the same position of the object pass through the exit pupils 602 and 603 and their projection positions shift from each other, this indicates an out-of-focus state. It is, therefore, possible to calculate a defocus amount based on the shift amount between the A and B images.

The focus detection unit 110 shown in FIG. 1 detects the shift amount between the A and B images. If there is a level difference between the A and B images due to shading when detecting the shift amount between the images, an error may occur in image shift detection or detection may fail. It is, therefore, necessary to correct shading.

Figure 5A:
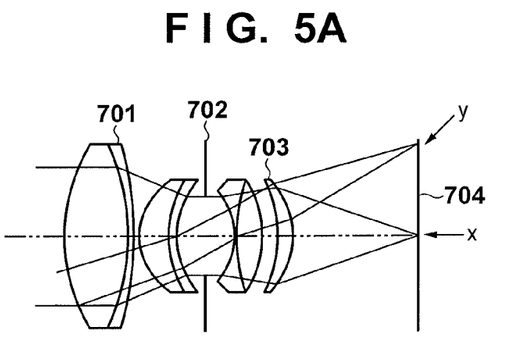
FIGS. 5A and 5B are views showing a vignetting shape depending on an image height and lens frames.
Figure 5B:
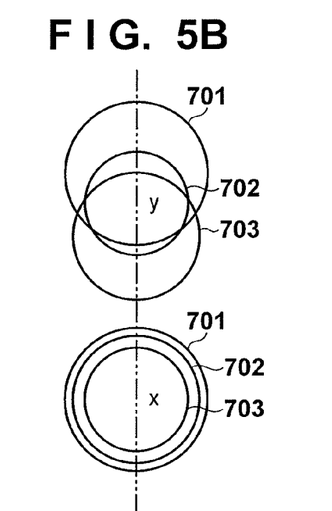

The reason why shading occurs will be described with reference to a lens sectional view shown in FIG. 5A. Referring to FIGS. 5A and 5B, reference numeral 701 denotes a front lens; 702, a stop; and 703, a rear lens. The frame of the front lens 701 will be referred to as a front frame hereinafter, and a frame formed by the rear lens 703 will be referred to as a rear frame hereinafter. Reference numeral 704 denotes an image sensing plane. FIG. 5B shows overlapping of the frames of the front lens 701, stop 702, and rear lens 703 when viewed from a position x on the image sensing plane 704, and overlapping of the frames of the front lens 701, stop 702, and rear lens 703 when viewed from a position y on the image sensing plane. When viewed from the position x, only the stop limits the amount of light. However, when viewed from the position y, the front frame 701 and rear frame 703 also limit the amount of light.

Figure 6:
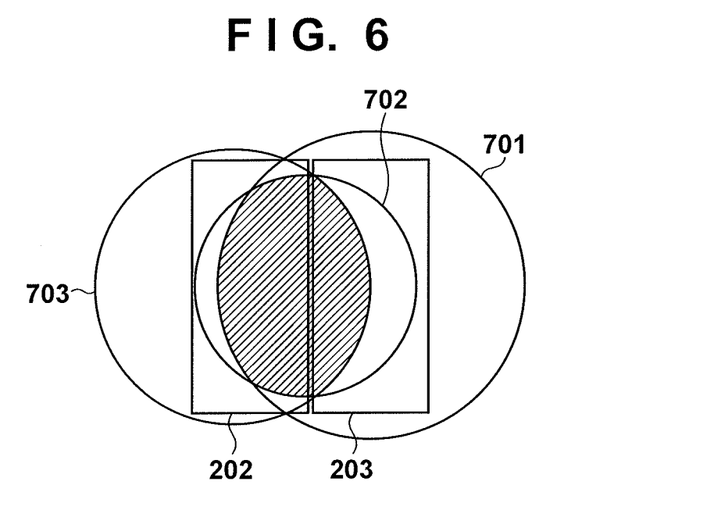
FIG. 6 is a view showing the relationship between the vignetting shape and a divided pixel.
Figure 7:
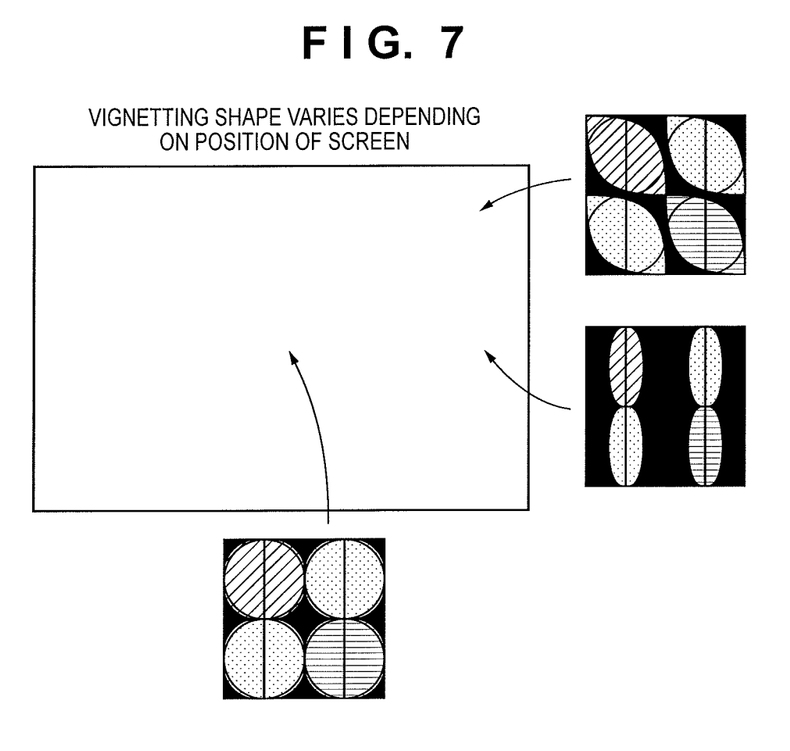
FIG. 7 is a view showing the relationship between a screen position and a vignetting state.

FIG. 6 shows overlapping of a range within which light reaches and the photoelectric conversion portions of the image sensor when viewed from the position y shown in FIGS. 5A and 5B. The photoelectric conversion portions 202 and 203 have largely different ranges within which light reaches. Shading indicates a phenomenon in which the amount of light decreases as the image height increases away from the center of the optical axis. The pupil-divided images have a property that the balance between the A and B images is lost as the image height increases. The shape of a hatched portion shown in FIG. 6 will be referred to as a vignetting shape, and FIG. 7 shows the relationship between the vignetting shape and a pixel position on the sensor. The vignetting shape varies depending on a location, and gradually changes as the location shifts.

Figure 8A:
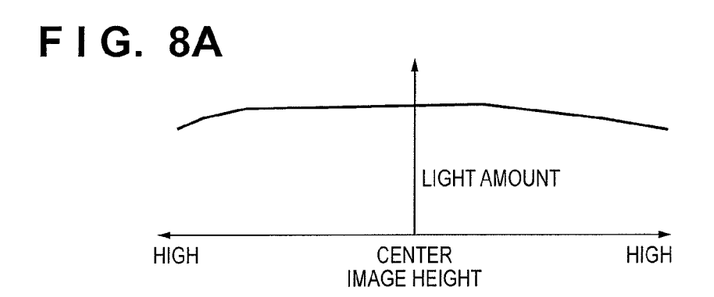
FIGS. 8A and 8B are views showing the relationship between shading and an image capturing signal.
Figure 8B:
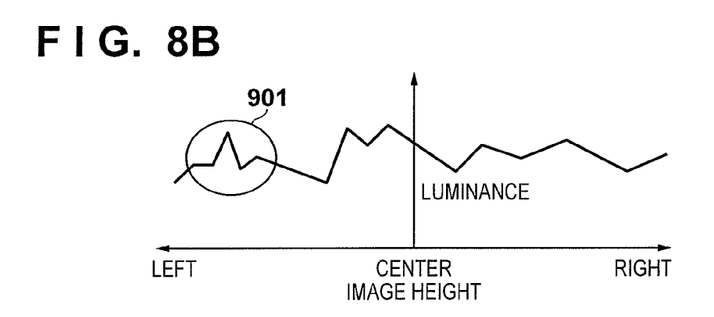

FIG. 8A is a view in which the abscissa represents a position on the image sensor 102 and the ordinate represents the amount of light. The shape shown in FIG. 8A indicates a shading image. By capturing a white uniform surface, it is possible to obtain an image matching the shading image shown in FIG. 8A. Unless a white uniform surface is captured, it is impossible to obtain a shading image. In general, a video signal is obtained by superimposition of the shading image and the image of the object, as shown in FIG. 8B. In this embodiment, a shading image is obtained from the video signal obtained by superimposition of the shading image and the image of the object, thereby obtaining a shading correction coefficient.

The principle of this embodiment will be explained with reference to FIG. 9. Although the focus plane has been described with reference to FIG. 4, the focusing lens is generally moved to match the focus plane with the image sensing plane. The focus plane 605 is moved by moving the focusing lens to match the plane of the image sensor 102.

Figure 9:
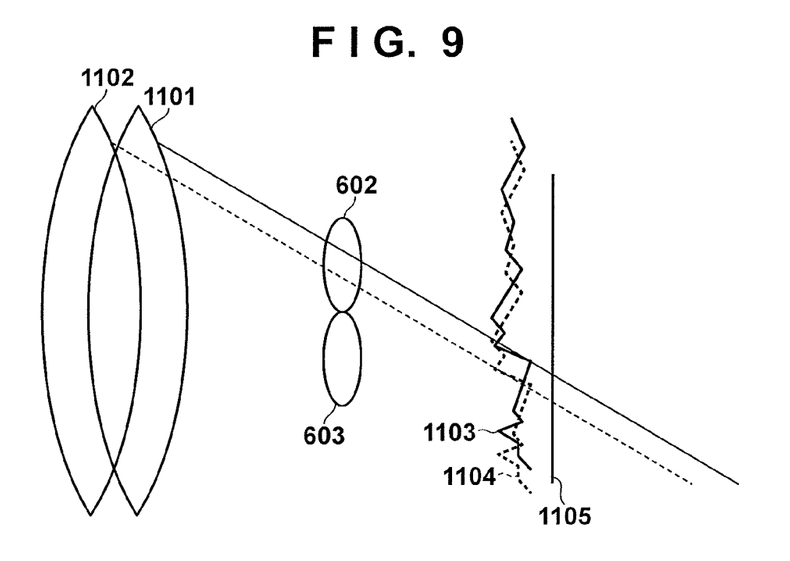
FIG. 9 is a view showing the relationship between a focusing lens position and an image shift position.

In FIG. 9, reference numeral 1105 denotes a plane of the image sensor. When the focusing lens is at a position as indicated by reference numeral 1101, an image having passed through the pupil 602 is at a position on the image sensing plane as indicated by reference numeral 1103. To the contrary, if the focusing lens is at a position as indicated by reference numeral 1102, the image moves to a position as indicated by reference numeral 1104. That is, it is indicated that it is possible to acquire images when the same object is projected at different positions on the image sensing plane. In this embodiment, a shading correction coefficient is obtained using a plurality of images corresponding to the different focusing lens positions. Since the movement amount of the image with respect to the movement amount of the focusing lens is a constant amount determined by a baseline length, a position to which the image has moved can be known by only multiplying the lens movement amount by a constant coefficient.

Figure 10:
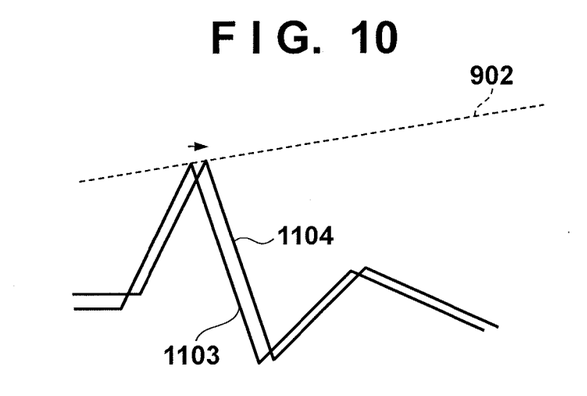
FIG. 10 is a view showing the relationship between an image shift and shading.

FIG. 10 is an enlarged view showing a portion 901, shown in FIG. 8B, of the signals 1103 and 1104. The signals 1103 and 1104 shown in FIG. 10 are obtained by enlarging portions of the video signals of the same object exposed at different focusing lens positions. A line connecting corresponding points of the signals matches a shading curve 902. It is, therefore, possible to obtain a shading curve by comparing the video signals of the same object at locations having a horizontal shift amount determined based on a focusing positional difference. Note that since shading decreases a transmittance, it is necessary to obtain a level ratio rather than a difference. When the focusing lens is moved by a small amount, the image also moves by only a small amount. It is, however, possible to obtain a shading curve for the entire area by continuously connecting the obtained ratios.

Figure 11:
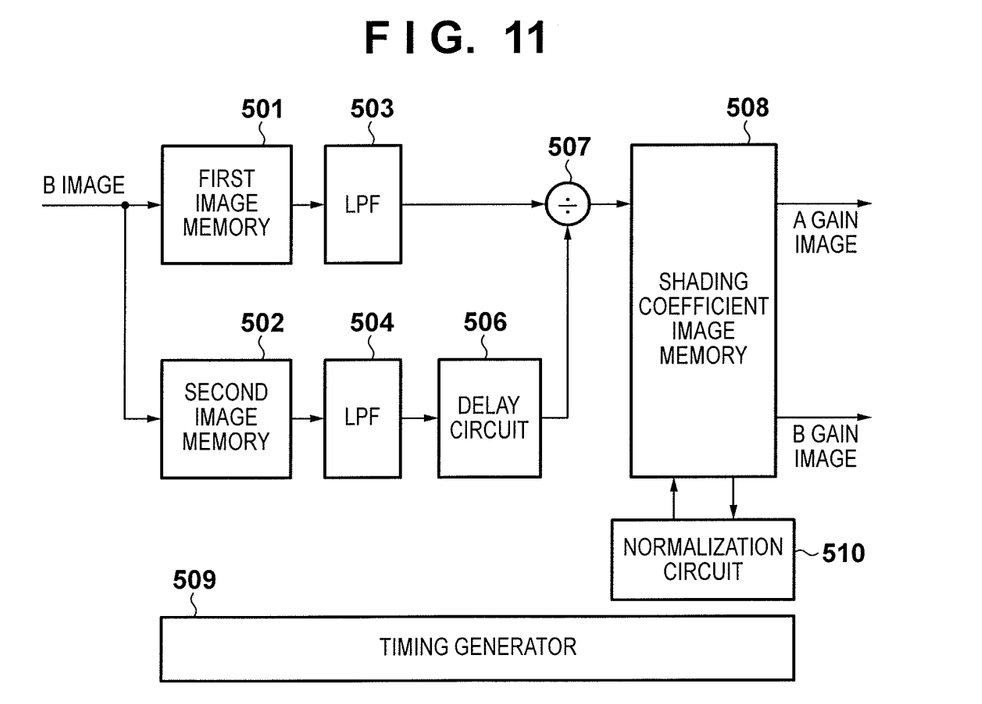
FIG. 11 is an internal block diagram showing a shading correction coefficient calculation unit.

FIG. 11 is an internal block diagram showing details of the shading correction coefficient calculation unit 108 shown in FIG. 1. The shading correction coefficient calculation unit 108 is finely controlled by the microcomputer 109, and a timing generator 509 precisely controls internal circuits.

An input signal is only a B image, and time-divisionally exposed B images corresponding to different focusing lens positions are respectively stored in a first image memory 501 and second image memory 502. Low-pass filters 503 and 504 remove the high frequency components of the first and second images, and a delay circuit 506 delays only the second image by a predetermined amount. The images input to a divider 507 for obtaining a ratio horizontally shift due to the effect of the delay circuit 506. The amount by which the delay circuit 506 delays the image is determined based on its baseline length.

The output of the divider 507 is a transmittance ratio with a pixel at a distance of a pitch determined based on the baseline length. A shading coefficient image memory 508 can accumulate correction coefficients for one screen. When correction coefficients for the entire screen are accumulated, a normalization circuit 510 reads out a coefficient, normalizes it to a gain with a magnification of 1 at the center of the image height, and writes back the result in the shading coefficient image memory 508. After that, A and B gain images are read out at a timing according to an overall synchronization signal in synchronism with the image sensor. Since the input first and second images are B images, the A gain image is generated by addressing the memory so as to be the inverted image of the B gain image.

Figure 12:
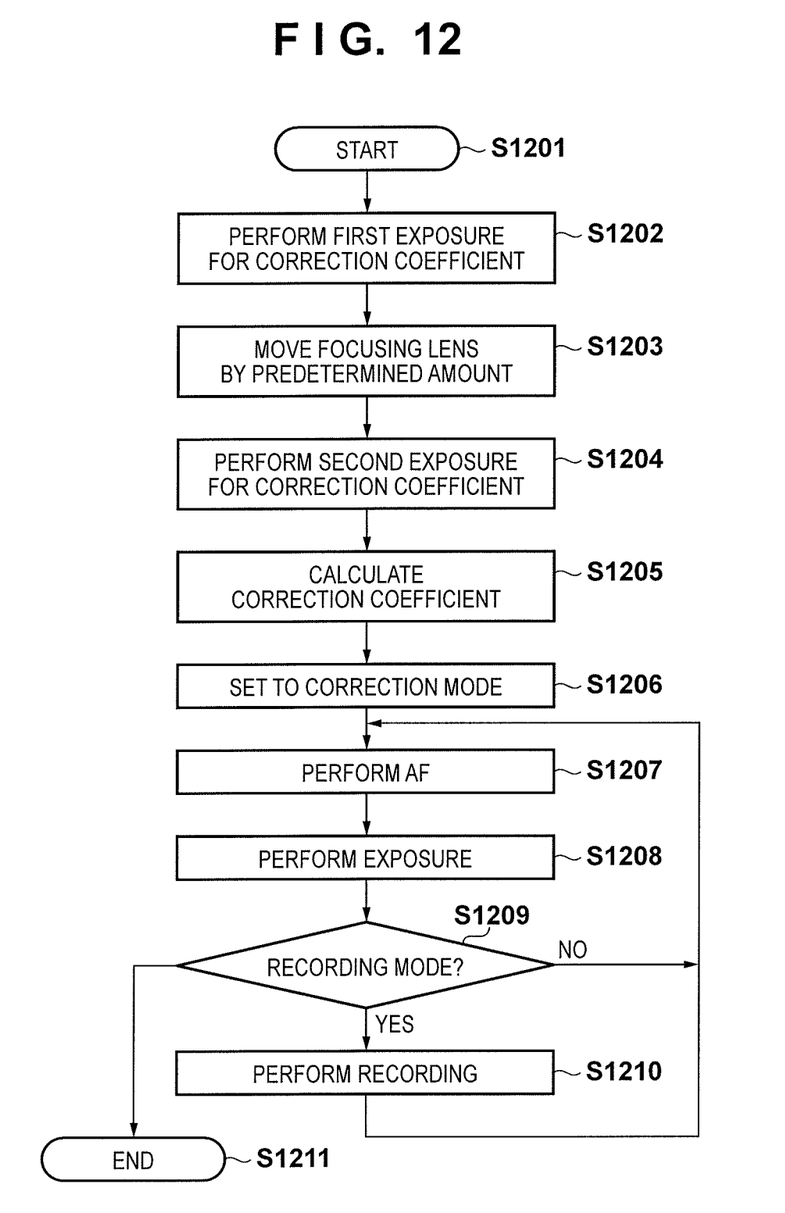
FIG. 12 is a flowchart illustrating the overall operation of the image capturing apparatus.

Control of the overall image capturing apparatus by the microcomputer 109 will be described with reference to a flowchart shown in FIG. 12.

In step S1201, a system starts. In step S1202, first exposure for a correction coefficient is performed. A readout B image signal is then stored in the first image memory 501. In step S1203, the lens 101 is driven to move the focusing lens by a predetermined amount. In step S1204, second exposure for a correction coefficient is performed. A readout B image signal is stored in the second image memory 502.

In step S1205, a correction coefficient is calculated. That is, a readout operation is performed for the first image memory 501 and second image memory 502, and a predetermined pitch ratio signal is accumulated in the shading coefficient image memory 508, and read out by the normalization circuit 510. After that, the signal is normalized to a gain with a magnification of 1 at the center of the optical axis, and written back in the shading coefficient image memory 508.

In step S1206, when the mode is set to a correction mode, the A and B gain images are output in synchronism with the overall synchronization signal. In step S1207, autofocus is performed. At this time, the A and B images undergo shading correction by the shading correction units 106 and 107, and are input to the focus detection unit 110. The microcomputer 109 reads out the result of the focus detection unit 110, and drives the focusing lens to perform focusing.

In step S1208, exposure is performed. In step S1209, it is determined whether the mode is a recording mode, thereby determining whether to branch to step S1207, branch to step S1210 to perform recording, or branch to step S1211 to terminate the process.

Although not shown, an operation member is connected to the microcomputer 109, and an instruction from the user can be known. Repeating the process from step S1207 to step S1210 can record an image while performing focus detection.

(Second Embodiment)

An image capturing apparatus according to the second embodiment of the present invention will be described below with reference to FIGS. 13A to 13D. FIGS. 13A to 13D are views showing the pixel structure of an image sensor according to the second embodiment. A photoelectric conversion portion is divided into four photoelectric conversion portions 1401, 1402, 1403, and 1404 in correspondence with a microlens 201. By using these pixels grouped as indicated by dotted lines in FIG. 13C, it is possible to obtain an A image by adding the signals of the photoelectric conversion portions 1401 and 1403, and obtain a B image by adding the signals of the photoelectric conversion portions 1402 and 1404.

Figure 13A:
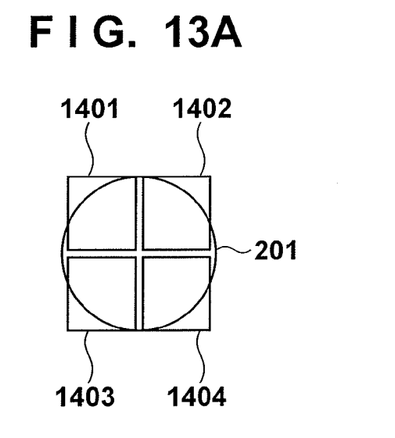
FIGS. 13A to 13D are views each showing the pixel structure of an image sensor according to the second embodiment of the present invention.
Figure 13B:
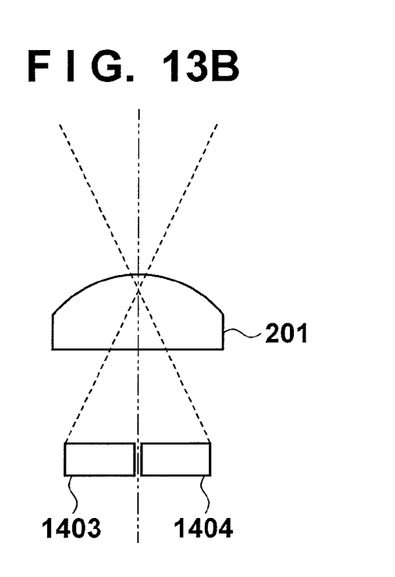
Figure 13C:
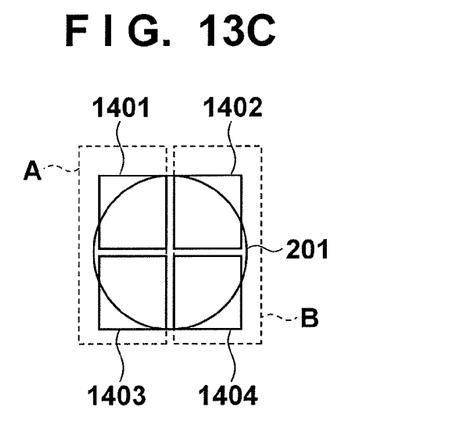
Figure 13D:
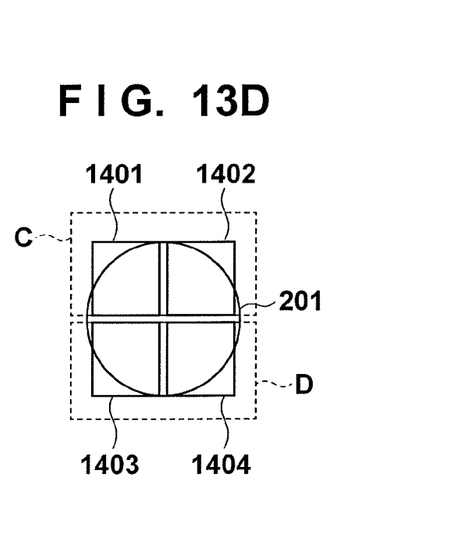

Furthermore, as shown in FIG. 13D, a C image signal is obtained by adding the signals of the photoelectric conversion portions 1401 and 1402 and a D image signal is obtained by adding the signals of the photoelectric conversion portions 1403 and 1404. As described above, dividing the photoelectric conversion portion into the four portions makes it possible to generate signals in an arrangement in which pupil division is performed in the vertical direction and in an arrangement in which pupil division is performed in the horizontal direction.

Figure 14:
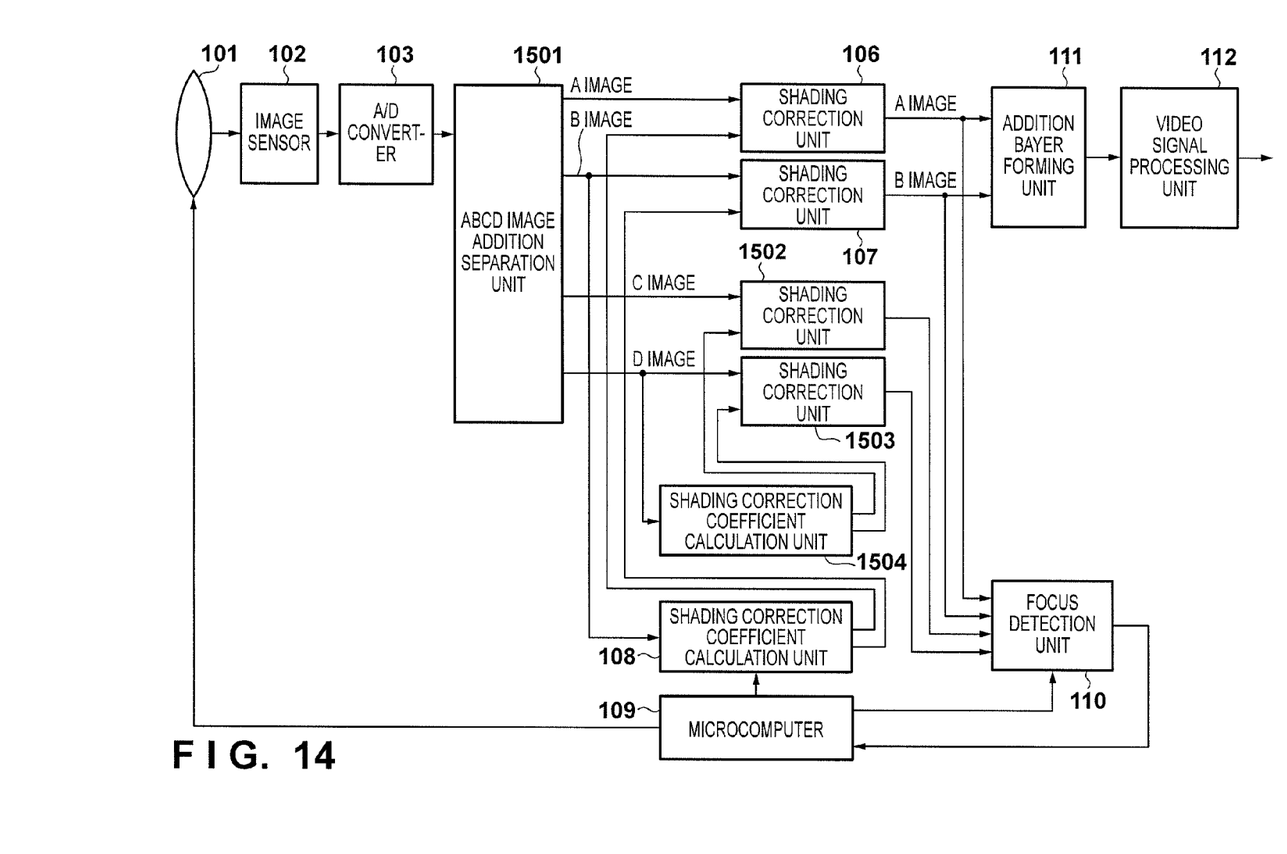
FIG. 14 is a block diagram showing the arrangement of an image capturing apparatus according to the second embodiment of the present invention.

FIG. 14 is a block diagram showing the arrangement of the image capturing apparatus according to the second embodiment. An ABCD image addition separation unit 1501 generates the above-described A, B, C, and D images. The A and B images are processed in the same manner as that in the first embodiment. Since the vertically pupil-divided signals are newly generated in the C and D images, a new shading correction coefficient calculation unit 1504 is added. Since a vertical image shift occurs, an internal delay occurs for each line to correspond to the vertical shift. Vertically pupil-divided images and horizontally pupil-divided images are input to a focus detection unit 110, thereby allowing focus detection for a wider variety of objects.

Although the embodiments of the present invention have been described, the present invention is not limited to them, and various modifications and changes can be made within the spirit and scope of the present invention.

In the first and second embodiments, for example, a case in which a plurality of photodiodes are used to perform pupil division with respect to one microlens has been explained. However, as long as pupil-divided signals are used, it is possible to obtain the same effects for signals pupil-divided by blocking light between the microlens and photodiodes.

In addition, in the first and second embodiments, the shading coefficient of the A image is obtained by inverting the shading coefficient of the B image. However, these coefficients may be separately calculated.

In the second embodiment, the signals having undergone horizontal shading correction are added to obtain a Bayer array. However, it is desirable to obtain a Bayer array by adding signals which have been corrected by both the vertical and horizontal shading coefficients, since it is possible to obtain a better video signal.

Although the first and second embodiments assume an image obtained by a single-chip image sensor, it is also possible to obtain the effects of the present invention using a two- or three-chip image sensor. A position where pupil division is performed need not be between the microlens and the photodiodes.

Figure 15:
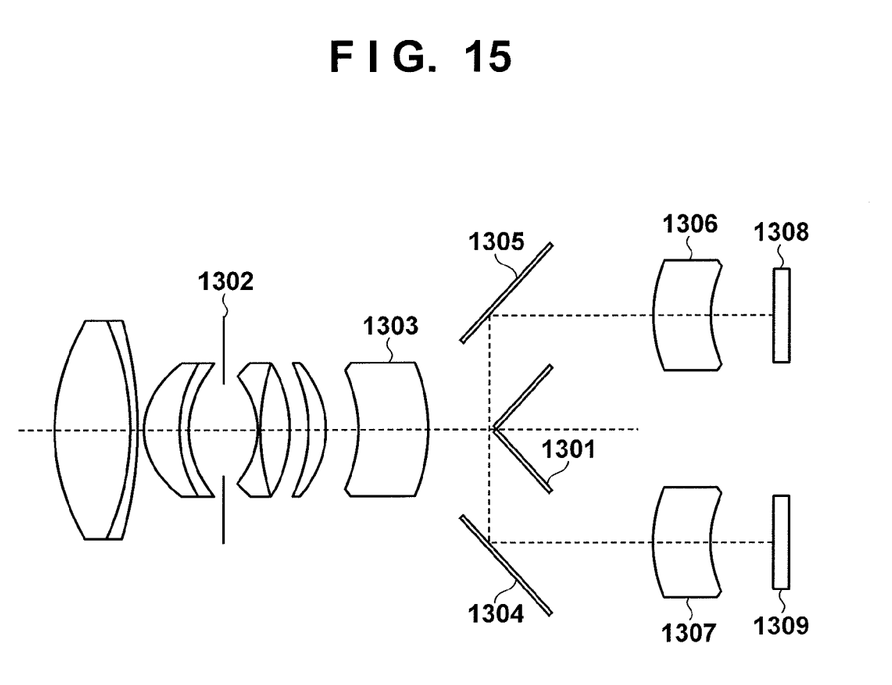
FIG. 15 is a view showing the arrangement of a relay lens.

FIG. 15 shows the optical structure of a system which separates incident light into left and right images at the same time in a collimated light area (an area where light spread from a point light source at an object-side focus position is collimated) of a relay lens, and exposes A and B images using different image sensors. Reference numeral 1301 denotes mirrors; 1302, a stop; and 1303, a relay lens. The mirrors 1301 divide light collimated by the relay lens 1303 into left and right light beams. The divided light beams are reflected by mirrors 1305 and 1304 to be guided to imaging lenses 1306 and 1307, thereby forming images on image sensors 1308 and 1309, respectively. This arrangement makes it possible to simultaneously obtain the A and B images using the two image sensors. It is thus possible to obtain the same effects as those in the first and second embodiments. The A and B images may be time-divisionally exposed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-116245, filed May 31, 2013, which is hereby incorporated by reference herein in its entirety.

What is claimed is:

1. An image capturing apparatus comprising:
    an image sensor including a photoelectric conversion portion configured to receive light beams having passed through a first portion of a pupil area of an imaging lens and output an image signal, wherein the pupil area of the imaging lens includes the first portion and a second portion;
    a comparison unit configured to compare a plurality of image signals which are obtained by capturing light beams having passed through the first portion of the pupil area by the photoelectric conversion portion while shifting a focus position of the imaging lens; and
    a calculation unit configured to calculate a correction coefficient for shading on the image sensing plane based on the image shift amount obtained by comparing signals corresponding to the same object among the plurality of image signals in the comparison unit.

2. The apparatus according to claim 1, wherein said comparison unit compares the signals corresponding to the same object after applying a low-pass filter to the signals of the same object.

3. The apparatus according to claim 1, wherein said calculation unit specifies the signals corresponding to the same object from two signals at different focus positions based on a shift amount of a focus lens on an optical axis of a imaging lens, and calculates the shading correction coefficient at each image height based on a ratio between the specified signals.

4. The apparatus according to claim 1, wherein said image sensor includes, as the photoelectric conversion portion, a first photoelectric conversion portion configured to receive light beams having passed through the first portion of the pupil area of the imaging lens, and a second photoelectric conversion portion configured to receive light beams having passed through the second portion of the pupil area of the imaging lens.

5. The apparatus according to claim 4, further comprising a focus detection unit configured to, after correcting a signal obtained from said first photoelectric conversion portion and a signal obtained from said second photoelectric conversion portion using the shading correction coefficient, calculate a defocus amount based on a shift amount between the signal obtained from said first photoelectric conversion portion and the signal obtained from said second photoelectric conversion portion.

6. The apparatus according to claim 4, further comprising an addition unit configured to, after correcting a signal obtained from said first photoelectric conversion portion and a signal obtained from said second photoelectric conversion portion using the shading correction coefficient, add the signals to obtain a video signal.

7. The apparatus according to claim 4, wherein the calculation unit calculates the correction coefficient for shading on the plurality of image signals obtained from said second photoelectric conversion portion by inverting the correction coefficient for shading on the plural of image signal obtained from said second photoelectric conversion portion.

8. The apparatus according to claim 1, wherein the image sensor includes a plurality of unit pixels each having one microlens and a plurality of photoelectric conversion portions under the one microlens.

9. The apparatus according to claim 8, wherein the plurality of photoelectric conversion portions are two photoelectric conversion portions.

10. The apparatus according to claim 8, wherein the plurality of photoelectric conversion portions are four photoelectric conversion portions.

11. The apparatus according to claim 1, further comprising a dividing unit which divide light beams having passed through the pupil area of the imaging lens into a plurality of groups of light beams each corresponding to a plurality of divided areas of the pupil area, wherein the image sensor includes different image sensors, and the light beams of respective groups are incident on the different image sensors which are arranged at different positions.

12. The apparatus according to claim 11, wherein the calculation unit calculates the correction coefficient for shading in a direction in which the pupil area is divided.

13. The apparatus according to claim 1, wherein a comparison unit configured to compare the plurality of image signals time-divisionally exposed corresponding to different focus positions.

14. A control method for an image capturing apparatus which includes an image sensor having a photoelectric conversion portion configured to receive light beams having passed through a first portion of a pupil area of an imaging lens and output an image signal, wherein the pupil area of the imaging lens includes the first portion and a second portion, the method comprising the steps of:
   causing a a comparison unit to compare a plurality of image signals which are obtained by capturing light beams having passed through the first portion of the pupil area by the photoelectric conversion portion while shifting a focus position of the imaging lens; and
   causing a calculation unit to calculate a correction coefficient for shading on the image sensing plane based on the image shift amount obtained by comparing signals corresponding to the same object among the plurality of image signals in the comparison unit.

* * * * *